US006626255B1

United States Patent
Timm

(10) Patent No.: US 6,626,255 B1
(45) Date of Patent: Sep. 30, 2003

(54) TOWING VEHICLE FOR TOWING PERSONS MOVING ROLLERS OR GLIDING BODIES

(75) Inventor: Antonio Timm, Ulm (DE)

(73) Assignee: Max Stinglhammer, Holzhausen (DE); part interest ( * ) Notice: Subject to any disclaimer, the term of this patent is extended or adjusted under 35 U.S.C. 154(b) by 0 days.

(21) Appl. No.: 09/890,334

(22) PCT Filed: Jan. 22, 2000

(86) PCT No.: PCT/DE00/00188

§ 371 (c)(1),
(2), (4) Date: Jul. 26, 2001

(87) PCT Pub. No.: WO00/44607

PCT Pub. Date: Aug. 3, 2000

(30) Foreign Application Priority Data

Jan. 26, 1999 (DE) ........................................ 199 02 963

(51) Int. Cl.[7] .............................................. B62D 63/00
(52) U.S. Cl. ........................ 180/7.1; 180/9.22; 180/19.3
(58) Field of Search ................................. 180/7.1, 19.1, 180/19.3, 11, 13, 9.22, 9.23

(56) References Cited

U.S. PATENT DOCUMENTS

| 5,385,210 | A | * | 1/1995 | Harvey ........................ 180/11 |
| 5,546,089 | A | * | 8/1996 | Talbot ........................ 180/19.1 |
| 5,562,176 | A | * | 10/1996 | Lucernoni et al. ......... 180/19.3 |
| 5,913,373 | A | * | 6/1999 | Forrest ....................... 180/19.1 |
| 2002/0153179 | A1 | * | 10/2002 | Kobayashi et al. ........ 180/19.3 |

* cited by examiner

Primary Examiner—Lesley D. Morris
Assistant Examiner—Matthew Luby
(74) Attorney, Agent, or Firm—Thomas M. Freiburger

(57) ABSTRACT

The invention relates to a towing vehicle which moves on rollers or sliding bodies, for towing persons. The towing vehicle is provided with a motor drive which drives a driving wheel (1) that is mounted in a chassis (2). The towing vehicle can be controlled by the person through a steering column (8). According to the invention, the chassis (2) also has a supporting wheel (4) which is located behind the driving wheel (1). The steering column (8) is fixed to the chassis by a pitch joint (7) running parallel to the axis of rotation of the driving wheel (1), said pitch joint being situated in front of the axis of the driving wheel (1). The invention enables the towing vehicle to be used especially for towing inline skaters at high speeds.

12 Claims, 3 Drawing Sheets

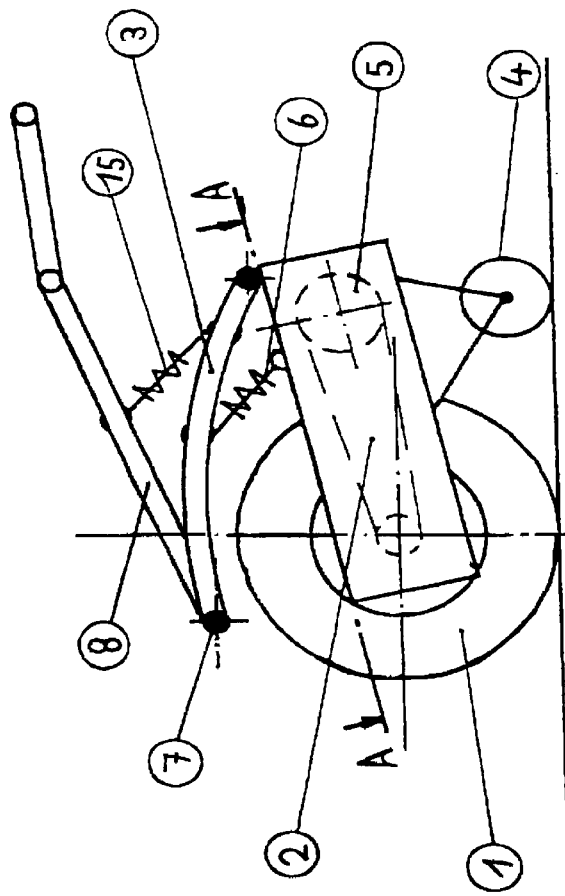
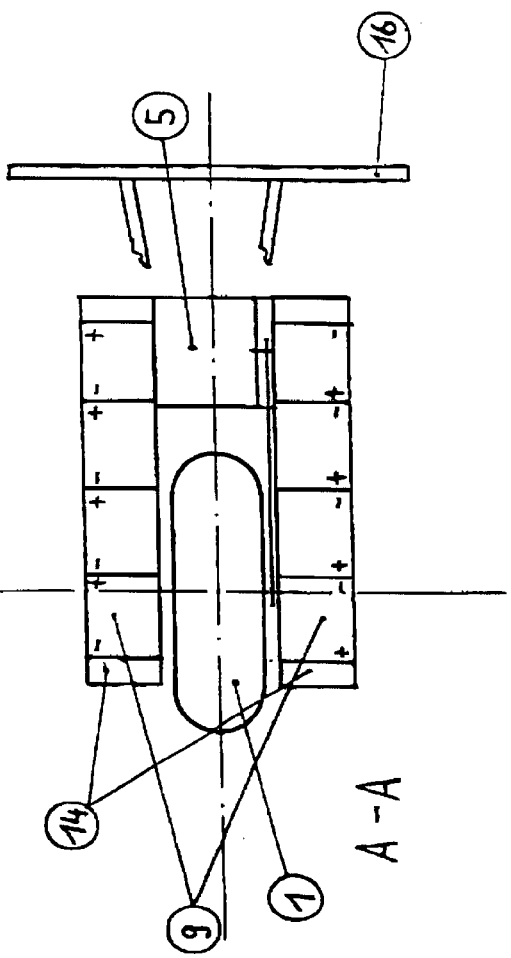
Fig. 1
Fig. 2
A-A

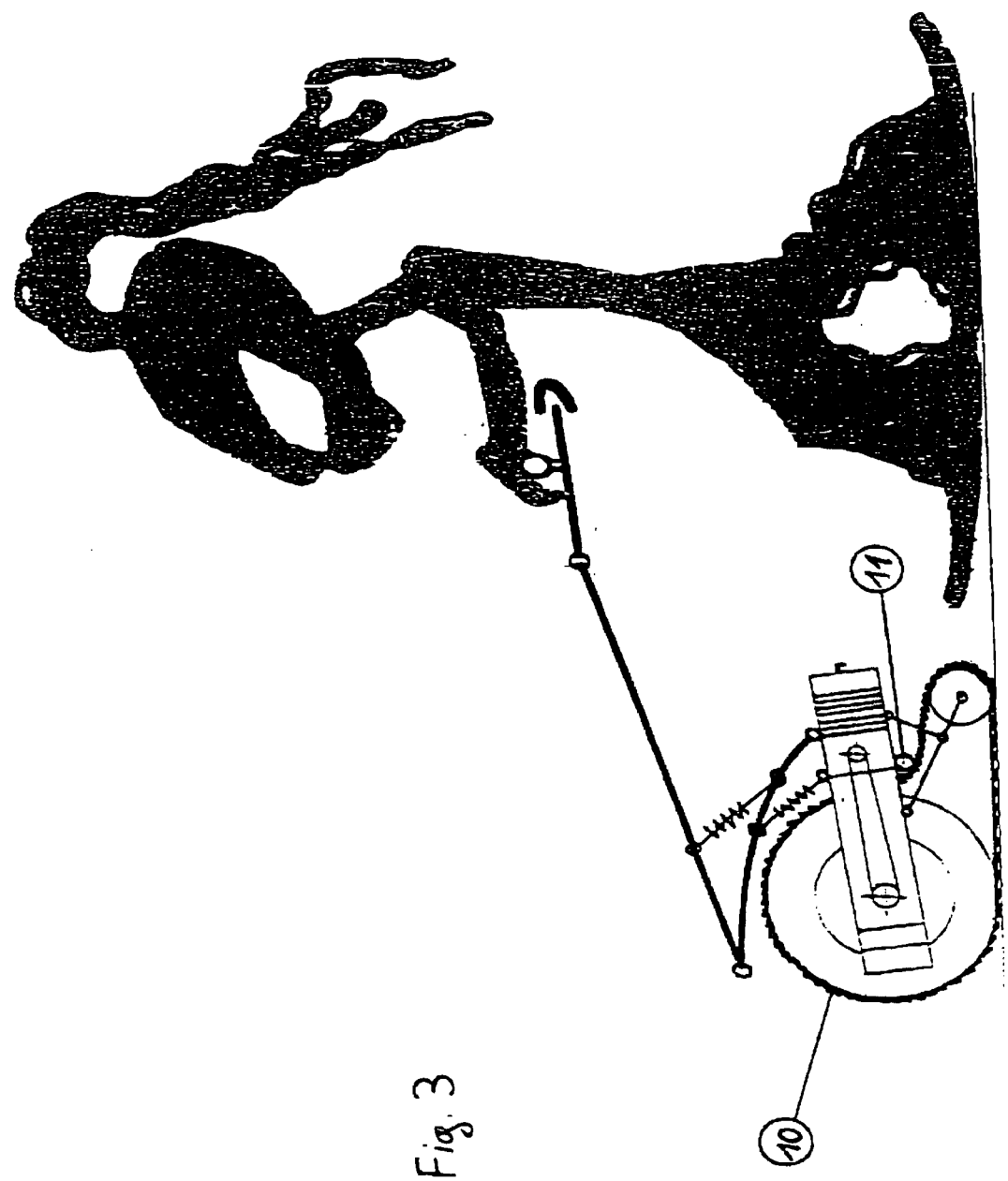

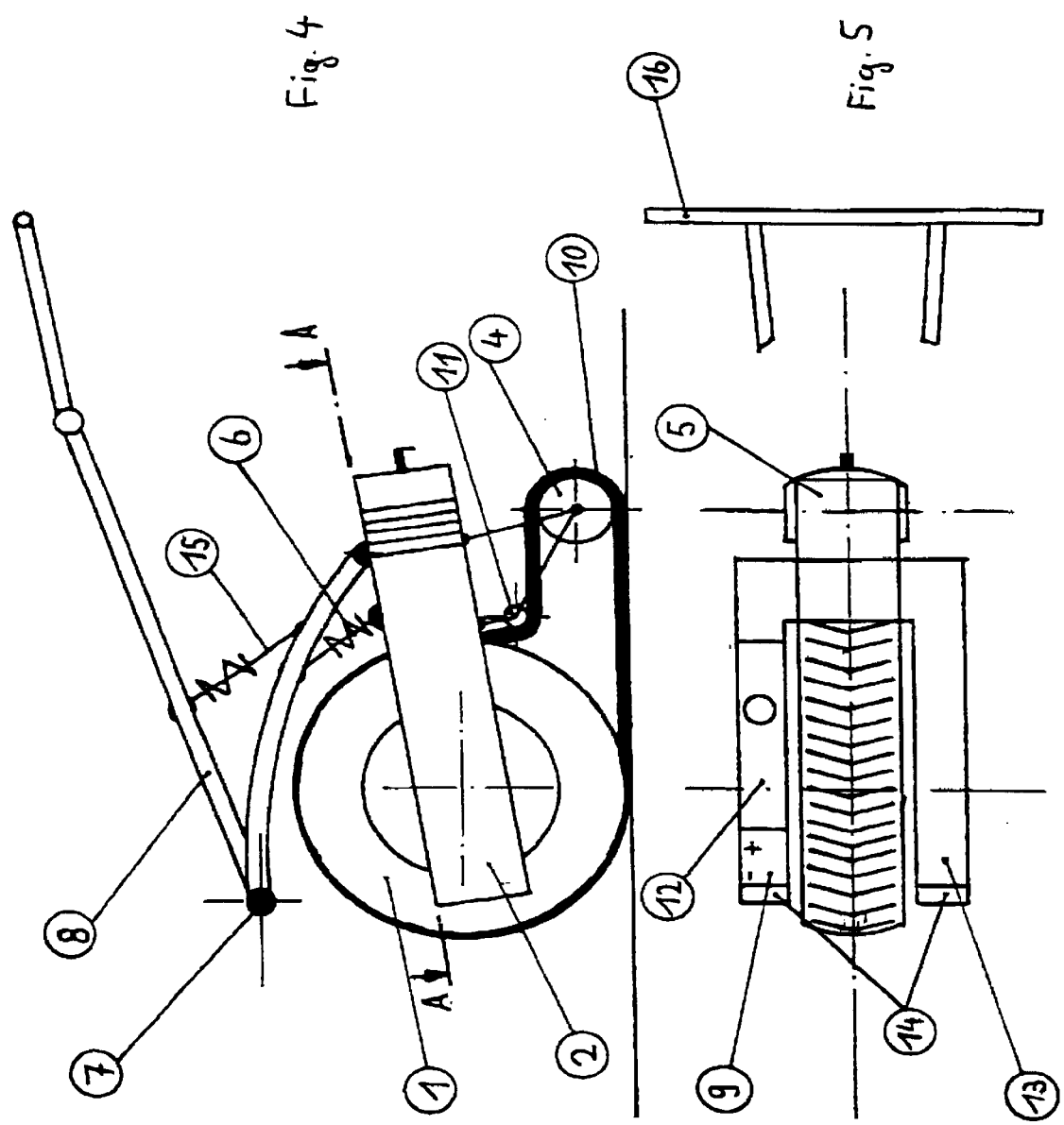

TOWING VEHICLE FOR TOWING PERSONS MOVING ROLLERS OR GLIDING BODIES

This invention pertains to a vehicle for towing persons which moves on rollers or gliding bodies in accordance with the preamble to claim 1.

In past years movement on rollers or runners has become increasingly important For example, skateboards, mountainboards, longboards, skateboards, or inline skates are used to move on rollers. Movement on gliding bodies can be performed by means of ice skates, sleds, snowboards, skis. and other devices, special gliding bodies also being used to move on water. Persons who use the sport devices mentioned to move will be called skaters below.

The maximum speed of a skater who moves by means of his own muscle power depends on his musculature and fitness as well as the slope of the path travelled. Obviously, the means of locomotion is also important.

Experience also shows that many skaters would very much like to travel faster than their musculature, fitness, or the route travelled allow. In downhill competitions in which the skaters travel down closed inclines, maximum speeds of 80 km/h are attained for example. The world record for the speed of an inline skater towed by a race car is in excess of 300 km/h.

With today's inline skates an average skater can travel about 35 km/h on a level road using his own physical strength.

Therefore, higher speeds can only be achieved using a towing vehicle. There is a need to present a vehicle to tow persons, in particular on rollers or gliding bodies, which achieves high speeds, which can be steered and braked safely despite a relatively high weight and, nevertheless, is easy to handle and to transport.

A vehicle for towing persons on rollers is known from U.S. Pat. No. 4,456,089-A, the towing vehicle having a motor drive which drives a drive wheel mounted in a chassis. The towing vehicle can be steered by the person by means of a longitudinal column. The problem with this device is that the complete weight of the vehicle, with motor, gears, tank, and chassis, as for example with the inclination illustrated in FIG. 1, has to be held by the person to be towed, the weight being increased by the drive torque during acceleration or reduced during bracing. Consequently, the vehicle weight and the torque of the motor produce uncontrollable forces which can no longer be controlled by the skater, especially at high speeds. Therefore, severe accidents can result.

In the case of the device known from U.S. Pat. No. 5,385,210, the dead weight of the towing vehicle is definitely better balanced but the acceleration and braking forces cannot be controlled with this device, either, so that problems similar to the prior art described above result.

Similar devices, but to push a moving person are known from U.S. Pat. No. 5,562,176. A means of locomotion in the form of a vehicle for pushing skiers with a crawler drive is known from WO 97/18866.

None of the devices described is suitable for high speeds such as desired in racing events in particular, because they are not safe enough and do not have the required ease of handling. In addition, none of the known devices is suitable for towing on snow surfaces.

Therefore, this invention is based on the technical problem of presenting a vehicle for towing persons which moves on rollers or gliding bodies which is driven by a motor and is suitable for high speed movement, especially on asphalt or snow, can be steered, accelerated and braked safely, and can be handled easily.

This problem is solved by the invention specified in claim 1. Advantageous further developments of the invention are specified in the sub-claims.

The inventive device pertains to a towing vehicle which has a drive wheel mounted in a chassis, the person being able to steer the towing vehicle by means of a steering column. In accordance with the invention, the chassis also has a support wheel located behind the drive wheel, the steering column being fixed to the chassis by a pitch point running parallel to the axis of rotation of the drive wheel, said pitch point being situated in front of the axis of the drive wheel. In addition to the drive wheel, the support wheel supports almost the entire weight of the chassis, the motor, the tank, etc. so that the person to be towed does not have to carry the dead weight of the towing vehicle. As the speed increases, the wheel load of the support wheel increases on account of the towing load and the pressure of the travelling wind on the housing of the towing vehicle. Furthermore, the support wheel absorbs the acceleration forces so that no additional torque impacts on the steering column just as the person starts to move. A suitable arrangement of the weight distribution on the towing vehicle also allows the braking forces to be equalized without any problem so that the towing vehicle cannot somersault during braking.

In order to be able to change the position of the steering column with regard to the chassis in a flexible manner, a pitch point running parallel to the axis of rotation of the drive wheel is located between the chassis and the steering column, said pitch point being situated in front of the axis of the drive wheel. Preferably the pitch point is combined with a spring element so that the steering column can be held in a basic position without weight forces having to be absorbed. Where desired, the steering column can be raised and, therefore, the load on the support wheel reduced, depending on the adjustment of the spring characteristic, and, if necessary, it can be raised quite high, for example if a tight corner is to be taken. The raising of the steering column can be facilitated if a substantial portion of the weight of the towing vehicle (e.g. in the form of a lead package) is placed in front of the drive axis.

In order to further reduce movements of the chassis with respect to the steering column, there can be an intermediate steering element which is fixed between the pitch point and a spring joint on the chassis. The spring joint is preferably located on the chassis between the drive wheel and the support wheel. The joints can also be equipped with shock absorbers. Preferably the springs on the pitch point or the spring joints are designed so that their resilience can be adjusted.

In further embodiments the support wheel can also be spring-mounted with respect to the chassis in order to reduce the effect of impacts on the chassis. The support wheel can also be motor-driven. For use in snow, the support wheel and drive wheel can be connected with one another by means of a revolving creeper band.

In order to be able to also employ the towing vehicle for other purposes, it can have a connecting device to which, for example, a wagon or the like can be attached.

The inventive design of the towing vehicle allows it, especially in its preferred embodiments, to achieve high speeds on different surfaces. A powerful motor can be used, which is required for high speeds and is suitable for that purpose. The torque of the motor is absorbed smoothly. The towing vehicle can be accelerated and braked without the skater having to move out of a relaxed driving position. He does not have to generate any force to hold the handlebar.

In the case of the preferred design with dual spring system, ground regularities are dampened and high speeds facilitated. At high speeds the person being towed shifts his own center of gravity downward. The structure of the towing vehicle also moves downward supported by the pressure of the travelling wind and of the towing load of the skater and is always at an optimal angle to the skater's arms. During braking the skater supports himself with his body weight against the steering element. In accordance with the braking intensity, the chassis is pressed downward as a result of the placement of the pitch point, preventing the towing vehicle from somersaulting.

The invention is explained below in detail using an embodiment. The figures are as follows:

FIG. 1 a lateral view of an inventive towing vehicle suitable for road traffic,

FIG. 2 a top view of a towing vehicle as illustrated in FIG. 1,

FIG. 3 a towing vehicle for use in snow,

FIG. 4 a lateral view of a towing vehicle as illustrated in FIG. 3, and

FIG. 5 a top view of a towing vehicle as illustrated in FIG. 3.

The towing vehicle illustrated in FIG. 1 has a drive wheel 1 mounted in a chassis 2, a support wheel 4 being provided at the back end of the chassis 2. Located above the support wheel 4 is the motor 5 to drive the drive wheel, for example via a pulley.

An intermediate steering element 3, which is spring-mounted on a telescopic leg 6, is attached to the rear upper side of the chassis 2. The intermediate steering element connects to the front side of the towing vehicle in a pitch point 7 which bears the steering column 8. A further telescopic leg 15 is situated between the steering column 8 and the interediate steering element 3.

In order to use the towing vehicle. the angle between the chassis 2 and the intermediate steering element 3 or the steering column 8 is adjusted at the telescopic leg 6 and/or the telescopic leg 15 prior to starting to drive. The steering column is to be positioned in such a way that the arms can be supported optimally during braking and the skater can handle the towing vehicle easily. This or the telescopic legs allow the towing vehicle to be adjusted individually for persons of different heights or where different wheel diameters are used. The towing vehicle also allows the length of the steering column 8 to be adjusted, depending on whether an inline skater or a longboard skater uses the vehicle, who require more or less distance between them and the chassis.

When driving, the skater stands upright with his inline skates and holds the handlebar 16 on the steering column 8 with both hands. Activation of the throttle produces a torque on the drive wheel which drives the towing vehicle. This torque produces a downward movement of the steering column. This downward movement is absorbed by the support wheel attached behind the drive wheel. The towing vehicle starts to move.

During, travel the towing machine is in equilibrium because the motor torque and the weight are borne by the support wheel. As a result the skater can accelerate effortlessly and concentrate on his leg work.

In a curve the skater shifts the weight of the towing vehicle and his own weight to the left or right. As well, when driving through a curve, he can correct his cornering by a slight tipping or raising of the handlebar as well as by means of motor force or braking.

In order to brake, the skater pulls the brake lever. As a result of the total weight of the towing vehicle and the weight distribution, the tire transferring the braking force has increased grip on the asphalt. The skater can support himself with his arms on the handlebar until the towing vehicle comes to a stop. He presses the steering column down in accordance with the intensity of the braking. The braking torque is counteracted via the telescopic legs 6, 15, so that the towing vehicle is prevented from somersaulting.

FIG. 2 shows a top view of the towing vehicle in FIG. 1. The motor 5 is located, as illustrated, above the steering wheel 4 and behind the drive wheel 1. In an upright position, therefore, the towing vehicle is essentially in equilibrium. On account of the low center of gravity of the towing vehicle, only minor lateral forces act on the handlebar 16.

If a further weight compensation is required on the chassis, additional lead weights 14 can be used. The battery 9 also assists in weight compensation. The drive of the motor 5 can be a combustion motor, in which case a tank is required. However, the motor can also be designed as an electric motor so that additional batteries are required.

FIG. 3 illustrates a towing vehicle to be used in snow, the proportions between a stylistically illustrated person and the towing vehicle being clear. In this case the towing vehicle has a creeper band 10 which encompasses the drive wheel 1 and the support wheel 4. A deflection roller 11 is provided to compensate for longitudinal tolerances of the creeper band.

FIG. 4 is a lateral view of the towing vehicle in FIG. 3. The design corresponds fundamentally to the design in FIG. 1 with the exception of the creeper band 10 and the deflection roller 11.

FIG. 5 contains a top view of a device from FIG. 3. which also shows a tank 12 located opposite to the transmission 13.

In particular, the towing vehicle is designed on a modular basis and can be dismantled at the hinge points, especially in order to allow the towing vehicle to be transported easily, for example in the trunk of a vehicle.

Reference Number List 1 drive wheel
2 chassis
3 intermediate steering element
4 support wheel
5 motor
6 telescopic leg
7 pitch point
8 steering column
9 battery
10 creeper band
11 deflection roller
12 tank
13 transmission
14 lead weight
15 telescopic leg
16 handlebar

What is claimed is:

1. A towing vehicle for towing persons which moves on rollers or gliding bodies, the towing vehicle having a front and a rear and having a motor drive which drives a drive wheel (1) mounted in a chassis (2), and a person being able to steer the towing vehicle from the rear by means of a steering column (8) characterized by the chassis (2) also having a support wheel (4) located behind the drive wheel (1) and the steering column (8) being attached to the chassis (2) by means of a pitch point (7) running parallel to the axis of rotation of the drive wheel (1), the pitch point (7) being situated in front of the axis of the drive wheel (1).

2. Towing machine in accordance with claim 1 characterized by a spring element (6) being located between the chassis (2) and the steering column (8).

3. Towing machine in accordance with claim 2 characterized by an intermediate steering element (3) being located between the chassis (2) and the steering column (8), the pitch point (7) being situated between the steering column (8) and the intermediate steering element (3), and the intermediate steering element (3) being fixed to the chassis by means of a spring joint.

4. Towing machine in accordance with claim 3 characterized by the spring joint being located on the chassis between the drive wheel (1) and the support wheel (4).

5. Towing machine in accordance with claim 2 or 3 characterized by at least one shock absorber being located between the chassis (2) and the steering column (8).

6. Towing machine in accordance with claim 3 characterized by spring resilience associated with the spring joint being adjustable.

7. Towing machine in accordance with claim 1 characterized by means enabling the person to control the braking and speed via the steering column.

8. Towing machine in accordance with one of claims 1–4 characterized by the support wheel being spring-mounted with respect to the chassis.

9. Towing machine in accordance with one of claims 1–4 characterized by the support wheel also being motor-driven.

10. Towing machine in accordance with one of claims 1–4 characterized by the motor being mounted in the chassis in such a way that the weight of the motor is borne essentially by the support wheel.

11. Towing machine in accordance with claim 2 characterized by the drive wheel and support wheel being connected by a creeper band (10) which encompasses both wheels.

12. Towing machine in accordance with claim 1 characterized by the chassis being equipped with a connecting device to attach a wagon or the like.

* * * * *

UNITED STATES PATENT AND TRADEMARK OFFICE
CERTIFICATE OF CORRECTION

PATENT NO. : 6,626,255 B1 Page 1 of 1
APPLICATION NO. : 09/890334
DATED : September 30, 2003
INVENTOR(S) : Antonio Timm It is certified that error appears in the above-identified patent and that said Letters Patent is hereby corrected as shown below:

On The Title Page: Item (73) Change: Max Stinglhammer, Holzhausen (DE); part interest To: Thomas Stritzl, Augsburg (DE); 50% interest and Max Stinglhammer, Holzhausen (DE); 50% interest Signed and Sealed this Twenty-second Day of May, 2007

JON W. DUDAS
*Director of the United States Patent and Trademark Office*